US012668665B2

(12) United States Patent
Chae

(10) Patent No.: US 12,668,665 B2
(45) Date of Patent: Jun. 30, 2026

(54) ANTIOXIDANT FOR FUEL CELL HAVING ANTIOXIDATIVE PROPERTY AND PROTON CONDUCTIVITY AND PRODUCING METHOD THEREOF

(71) Applicants: Hyundai Motor Company, Seoul (KR); Kia Corporation, Seoul (KR)

(72) Inventor: Il Seok Chae, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 814 days.

(21) Appl. No.: 18/085,075

(22) Filed: Dec. 20, 2022

(65) Prior Publication Data

US 2023/0374222 A1 Nov. 23, 2023

(30) Foreign Application Priority Data

May 17, 2022 (KR) ........................ 10-2022-0059926

(51) Int. Cl.

| | |
|---|---|
| ***C08G 75/24*** | (2006.01) |
| ***C08K 3/22*** | (2006.01) |
| ***H01M 4/86*** | (2006.01) |
| ***H01M 8/1032*** | (2016.01) |
| *H01M 8/10* | (2016.01) |

(52) U.S. Cl.

CPC ................ *C08G 75/24* (2013.01); *C08K 3/22* (2013.01); *H01M 4/8663* (2013.01); *H01M 8/1032* (2013.01); *C08K 2003/2213* (2013.01); *H01M 2008/1095* (2013.01)

(58) Field of Classification Search

CPC ............. C08K 3/22; C08K 2003/2213; H01M 4/8663; H01M 8/1032; H01M 8/1088

See application file for complete search history.

(56) References Cited

FOREIGN PATENT DOCUMENTS

| | | | |
|---|---|---|---|
| CN | 105810982 | * | 7/2016 |
| JP | 6929393 | B2 | 9/2021 |
| KR | 102246525 | B1 | 4/2021 |
| KR | 102328568 | B1 | 11/2021 |

OTHER PUBLICATIONS

KR20210109349 English translation. Kim et al. Korea. Sep. 6, 2021. (Year: 2021).*

CN105810982 English translation. Xu. China. Jul. 27, 2016. (Year: 2016).*

"Mechanical Properties and Chemical Durability of Nation/Sulfonated Graphene Oxide/Cerium Oxide Composite Membranes for Fuel-Cell Applications" Seo et al. Polymers MDPI.

"Advanced Materials for Improved PEMFC Performance and Life" Curtain et al. Journal of Power Sources.

(Continued)

*Primary Examiner* — Christopher P Domone

(74) *Attorney, Agent, or Firm* — Fox Rothschild LLP

(57) ABSTRACT

Disclosed are an antioxidant for a fuel cell having both antioxidative properties and proton conductivity, and a method of producing the same. The antioxidant may include: a metal oxide having antioxidant properties; and a proton conductive functional group bonded to the metal oxide, in which the proton conductive functional group may include a sulfonic acid group attached to the metal oxide by a sulfonation bond.

16 Claims, 2 Drawing Sheets

(56) References Cited

OTHER PUBLICATIONS

"Ionomer Degradation in Polymer Electrolyte Membrane Fuel Cells" Young et al. Journal of The Electrochemical Society, 157.
"Degradation Mitigation in Polymer Electrolyte Membranes Using Cerium Oxide as a Regenerative Free-Radical Scavenger" Trogadas et al. Electrochemical and Solid State Letters, 11(7) B113-B116 (2008).
"Radical-induced degradation mechanism of perfluorinated polymer electrolyte membrane" Uegaki et al. Journal of Power Sources 196 (2011) 9856-9861.
"Cesium Substituted 12-Tungstophosphoric (CSxH3—xPW12O40) Loaded on Ceria-Degradation Mitigation in Polymer Electrolyte Membranes" Zhao et al. Journal of Power Sources 190 (2009) 301-306.
"10 Degradation and Stabilization of Polymers" Billingham et al. Materials Science and Technology, cahn, haasen, kramer.
Hasan et al., "Promotion of the Hydrogen Peroxide Decomposition Activity of Manganese Oxide Catalysts" Hasan et al. Applied Catalysis A: General 181 (1999) 171-179.
"Development of Highly Durable PFSA Membrane and MEA for PEMFC Under High Temperature and Low Humidity Conditions" Endoh et al. Research Center, Asahi Glass Co., LTD.
Endoh, "Handbook of Fuel Cells. Fundamentals, Technology, Applications" John Wiley & Sons Ltd. (2010).
"Effect of CeOx Crystallite Size on the Chemical Stability of CeOx Nanoparticles" Banham et al. Journal of The Electrochemical Society 161 (10) F1075-F1080 (2014).
"MnO2/SiO2—SO3H Nanocomposite as Hydrogen Peroxide Scavenger for Durability Improvement in Proton Exchange Membranes" Zhao et al. Journal of Membrane Science 346 (2010) 143-151.
"Kinetic Simulation of the Chemical Stabilization Mechanism in Fuel Cell Membranes Using Cerium and Manganese Redox Couples" Gubler et al. Journal of The Electrochemical Society 159 (2) B211-B218 (2012).
Aoki et al., "Decomposition Mechanism of Perfluorosulfonic Acid Electrolyte in Polymer Electrolyte Fuel Cells" Aoki et al. ScienceDirect Electrochemisty Communications 8 (2006) 1509-1513.
P. Trogadas et al., J. Mater. Chem., 21, 19381-19388 (2011).
"Pt Band Formation Enhances the Stability of Fuel Cell Membranes" Macauley et al. ECS Electrochemistry Letters, 2 (4) F33-F35 (2013).
P. Trogadas et al., Electrochem. Solid-State Lett., 11, B113-B116 (2008).

* cited by examiner

ANTIOXIDANT FOR FUEL CELL HAVING ANTIOXIDATIVE PROPERTY AND PROTON CONDUCTIVITY AND PRODUCING METHOD THEREOF

CROSS-REFERENCE TO RELATED APPLICATION

This application claims under 35 U.S.C. § 119(a) the benefit of priority to Korean Patent Application No. 10-2022-0059926 filed on May 17, 2022, the entire contents of which are incorporated herein by reference.

TECHNICAL FIELD

The present disclosure relates to an antioxidant for a fuel cell having both antioxidative properties and proton conductivity, and a producing method thereof.

BACKGROUND

A proton exchange membrane fuel cell (PEMFC) includes: an anode, which is hydrogen fuel, a cathode to which oxygen is supplied, and a polymer electrolyte membrane disposed between the two electrodes, and this configuration is referred to as a membrane-electrode assembly (MEA).

After hydrogen supplied to the anode is separated into protons and electrons, the protons move through the membrane toward the cathode, which is a reducing electrode, and electrons move to the cathode through an external circuit. In the cathode, oxygen molecules, protons, and electrons react together to generate electricity and heat, and simultaneously generate water ($H_2O$) as a reaction by-product.

The polymer electrolyte membrane serves to transfer protons generated from the anode to the cathode and serves as a diaphragm preventing hydrogen, which is a fuel, from directly contacting oxygen. An electrolyte membrane containing perfluorinated sulfonic acid ionomer (PFSA) has high proton conductivity and exhibits high performance and stability under various humidification conditions, and is thus mainly used in the field of polymer electrolyte membrane fuel cells. However, the electrolyte membrane containing perfluorinated sulfonic acid ionomer is thermally degraded at a temperature of 100° C. or greater, and accordingly, proton conductivity, mechanical properties, and dimensional stability are rapidly degraded. For this reason, a fuel cell to which the electrolyte membrane containing perfluorinated sulfonic acid ionomer is applied is usually operated at a temperature of less than 100° C., or particularly, 80° C. or less. In addition, the proton conductivity depends on the exchange of protons through a sulfonic acid group ($—SO_3H$ group) in the presence of moisture, and thus it is necessary to maintain a hydration level of the polymer electrolyte membrane in an optimal state.

In general, hydrogen and oxygen, which are reactive gases of the fuel cell, cross over through the electrolyte membrane to promote the production of hydrogen peroxide (HOOH). Hydrogen peroxide generates highly reactive oxygen-containing radicals such as a hydroxyl radical (.OH) and a hydroperoxyl radical (.OOH). The radicals attack the electrode membrane containing the perfluorinated sulfonic acid ionomer and the ionomer of the electrode, causing chemical degradation of the electrolyte membrane and the electrode, which eventually reduces the durability of the fuel cell.

As a method for mitigating the above chemical degradation, an antioxidant may be added. Examples of the antioxidant include a primary antioxidant that functions as a radical scavenger or quencher and a secondary antioxidant that functions as a hydrogen peroxide decomposer.

Examples of representative primary antioxidants used in the electrolyte membrane containing perfluorinated sulfonic acid ionomer for the fuel cell include a cerium antioxidant such as cerium (III) nitrate hexahydrate and cerium oxide (or ceria). In addition, examples of the secondary antioxidant include a manganese oxidant such as manganese oxide.

If a material in a metal salt is used as the primary or secondary antioxidant, metal ions contained in the material in a metal salt bind to a terminal of the sulfonic acid group of the perfluorinated sulfonic acid ionomer to block the path through which protons may move. In addition, metals or metal oxides are tens to hundreds of nano-sized particles, so they block a hydrated microchannel of the electrolyte membrane to prevent the movement of protons. Therefore, it is generally known that the antioxidant increases a chemical durability of the electrolyte membrane but decreases proton conductivity.

Also, in the related art, a method of introducing a sulfonic acid group into nanoparticles as an ion exchange group for the transfer of protons has been reported. The method includes substituting the nanoparticles with the sulfonic acid group by treating the nanoparticles with a sulfonating agent such as sulfuric acid or chlorosulfonic acid. However, since the sulfuric acid and chlorosulfonic acid are a super strong acid, there is a problem in that metal ions are eluted from the nanoparticles. In addition, the sulfonic acid group is introduced to the nanoparticles by a sulfation bond, and thus the resultant is unstable, and the sulfonic acid group is easily separated from the nanoparticles.

SUMMARY

In preferred aspects, provided are an antioxidant for a fuel cell having excellent antioxidative properties and proton conductivity, and a producing method thereof.

The object of the present disclosure is not limited to the above-mentioned objects. The object of the present disclosure will become more apparent from the following description, and will be implemented by the means described in the claims and combinations thereof.

In an aspect, provided is an antioxidant for a fuel cell including: a metal oxide; and a proton conductive functional group bonded to the metal oxide. The proton conductive functional group may include a sulfonic acid group that is attached (e.g., covalently attached) to the metal oxide by a sulfonation bond.

The metal oxide may include one or more selected from the group consisting of cerium oxide, cerium zirconium oxide, gadolinium doped cerium oxide, samarium doped cerium oxide, cerium oxide supported by titanium oxide, and cerium oxide supported by silicon oxide.

The metal oxide may have a crystal size of about 10 nm to 100 nm as measured by X-ray diffraction.

The proton conductive functional group may include the sulfonic acid group and a linker connecting the metal oxide and the sulfonic acid group.

The proton conductive functional group may be represented by the following Formula 1:

[Formula 1]

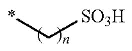

wherein * is a connection site to the metal oxide, and n is an integer of 1 to 10.

The antioxidant may satisfy the following conditions 1 and 2:

$I_{0,1} > I_{1,1}$ (Condition 1)

$I_{0,2} < I_{1,2}$ (Condition 2)

In condition 1, $I_{0,1}$ may be a height of a peak found in a wavenumber region of 3,400 $cm^{-1}$±100 $cm^{-1}$ in an infrared spectral spectrum for the metal oxide, and $I_{1,1}$ may be a height of a peak found in a wavenumber region of 3,400 $cm^{-1}$±100 $cm^{-1}$ in an infrared spectral spectrum for the antioxidant.

In condition 2, $I_{0,2}$ may be a height of a peak found in a wavenumber region of 1,170 $cm^{-1}$±100 $cm^{-1}$ in an infrared spectral spectrum for the metal oxide, and $I_{1,2}$ may be a height of a peak found in a wavenumber region of 1,170 $cm^{-1}$±100 $cm^{-1}$ in an infrared spectral spectrum for the antioxidant.

In an aspect, provided is a fuel cell including: an electrolyte membrane; a cathode disposed on one surface of the electrolyte membrane; and an anode disposed on the other surface of the electrolyte membrane. At least one of the electrolyte membrane, the cathode, and the anode may include the antioxidant as described herein.

The electrolyte membrane may include an amount of about 0.1 parts by weight to 10 parts by weight of the antioxidant based on 100 parts by weight of the ionomer.

In another aspect, provided is a method of producing an antioxidant for a fuel cell and the method includes the steps of: preparing an admixture including metal oxide, sultone, and a solvent; and reacting the admixture. A proton conductive functional group comprising a sulfonic acid group is attached (e.g., covalently attached) to the metal oxide.

The solvent may include toluene.

The solvent may not include an aqueous solvent.

The sultone may include a compound represented by the following Formula 2:

[Formula 2]

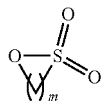

wherein m is an integer of 1 to 10.

The proton conductive functional group is represented by the following Formula 1:

[Formula 1]

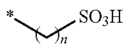

wherein * is a connection site to the metal oxide, and n is an integer of 1 to 10.

The antioxidant satisfies the following conditions 1 and 2:

$I_{0,1} > I_{1,1}$ (Condition 1)

$I_{0,2} < I_{1,2}$ (Condition 2)

in condition 1, $I_{0,1}$ is a height of a peak found in a wavenumber region of 3,400 $cm^{-1}$±100 $cm^{-1}$ in an infrared spectral spectrum for the metal oxide, and $I_{1,1}$ is a height of a peak found in a wavenumber region of 3,400 $cm^{-1}$±100 $cm^{-1}$ in an infrared spectral spectrum for the antioxidant, and in condition 2, $I_{0,2}$ is a height of a peak found in a wavenumber region of 1,170 $cm^{-1}$±100 $cm^{-1}$ in an infrared spectral spectrum for the metal oxide, and $I_{1,2}$ is a height of a peak found in a wavenumber region of 1,170 $cm^{-1}$±100 $cm^{-1}$ in an infrared spectral spectrum for the antioxidant.

Also provided is a vehicle that includes the fuel cell as describe herein.

According to the present disclosure, an antioxidant for a fuel cell having excellent antioxidative properties and proton conductivity and a producing method thereof may be obtained.

Other aspects of the invention are disclosed infra.

DETAILED DESCRIPTION

Figure 1:
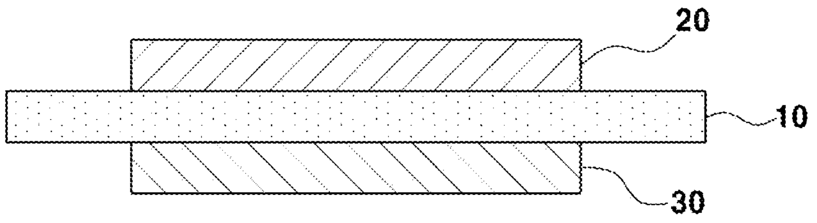
FIG. 1 shows a fuel cell according to an exemplary embodiment of the present disclosure.

The above objects, other objects, features, and advantages of the present disclosure will be easily understood through the following preferred embodiments related to the accompanying drawings. The present disclosure, however, is not limited to exemplary embodiments described herein and may also be embodied in other forms. On the contrary, exemplary embodiments introduced herein are provided to make disclosed contents thorough and complete and sufficiently transfer the spirit of the present disclosure to those skilled in the art.

It should be understood that terms such as "comprise" or "have", etc. as used herein, specify the presence of features, numerals, steps, operations, components, parts described herein, or combinations thereof, but do not preclude the possibility of the presence or addition of one or more other features, numerals, steps, operations, components, parts, or combinations thereof. In addition, when a portion such as a layer, a film, a region, or a substrate, is referred to as being "on" another portion, a portion may be "directly on" another portion or the other portion may be present therebetween. In contrast, when a portion such as a layer, a film, a region, or a substrate, is referred to as being "under" another portion, a portion may be "directly under" another portion or the other portion may also be present therebetween.

It should be understood that unless otherwise specified, all numbers, values, and/or expressions expressing quantities of components, reaction conditions, polymer compositions and formulations used in the present specification are approximate values obtained by reflecting various uncertainties of the measurement that arise in obtaining these values among others in which these numbers are essentially different. Therefore, they should be understood as being modified by the term "about" in all cases. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in this description, such ranges are continuous and include all values from a minimum value to a maximum value inclusive of the maximum value of such ranges, unless otherwise indicated. Furthermore, when such ranges refer to an integer, all integers from the minimum value to the maximum value inclusive of the maximum value are included, unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 shows an exemplary fuel cell according to an exemplary embodiment of the present disclosure. The fuel cell may include an electrolyte membrane 10, a cathode 20 disposed on one surface of the electrolyte membrane, and an anode 30 disposed on the other surface of the electrolyte membrane. At least one of the electrolyte membrane 10, the cathode 20, and the anode 30 may include the antioxidant according to the present disclosure.

The antioxidant may include a metal oxide having antioxidative properties and a proton conductive functional group bonded to the metal oxide.

The present disclosure is characterized in that the proton conductive functional group (e.g., sulfonic acid group or its derivative) is covalently attached to the metal oxide by a sulfonation bond.

For example, a sulfonic acid group ($-SO_3H$) may be applied to an antioxidant by a sulfation bond, so the result is unstable and the sulfonic acid group is easily removed.

Here, the sulfonation bond means having a structure of —C—S, and the sulfation bond means having a structure of —C—O—S.

In the related art, a sulfonic acid group was introduced by treating a metal oxide with a super strong acid such as sulfuric acid or chlorosulfonic acid, as illustrated in Scheme 1 below. The oxygen (O) element of a hydroxyl group present on the surface of a metal oxide and the sulfur (S) element of a sulfonic acid group directly bond to form a sulfation bond:

[Scheme 1]

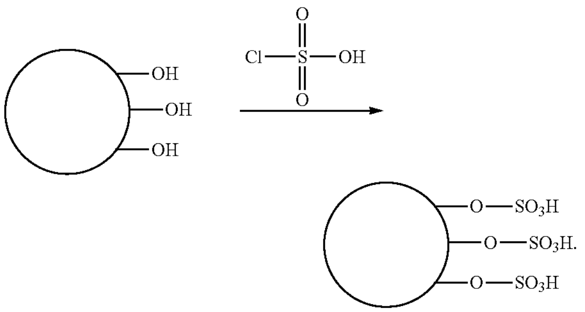

According to aspects of the present disclosure, a sulfonic acid group may be attached by treating a metal oxide with a neutral sultone rather than a super strong acid or a strong acid, as illustrated in Scheme 2 below. Accordingly, a sulfonation bond of a —C—S structure is formed:

[Scheme 2]

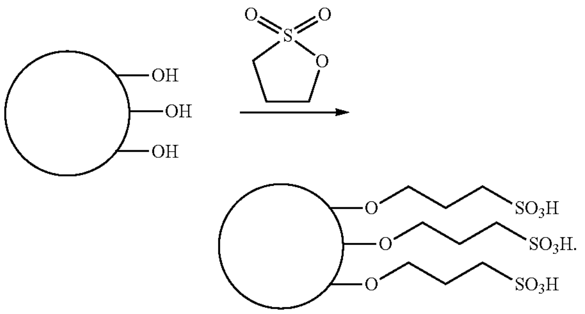

Thus, it is possible to obtain a more stable antioxidant.

The method of producing an antioxidant may include: preparing an admixture including a metal oxide, sultone, and a solvent; and reacting the admixture such that a proton conductive functional group can be attached to the metal oxide.

The solvent may include an aprotic solvent. The aprotic solvent may include one or more selected from the group consisting of toluene, chloroform, dimethoxyethane, tetrahydrofuran, methylene chloride, butanone, acetone, acetonitrile, sulfolane, and dimethylsulfoxide. The solvent preferably does not contain an aqueous solvent. When the solvent contains a component that serves as a nucleophilic agent such as an aqueous solvent or ammonia, before introducing a sulfonic acid group to the metal oxide, a ring-opening reaction of the sultone may occur, such that the amount of the sulfonic acid group introduced may not be sufficient.

The metal oxide may include any material having antioxidative properties. For example, the metal oxide may include one or more selected from the group consisting of cerium oxide, cerium zirconium oxide, gadolinium doped cerium oxide, samarium doped cerium oxide, cerium oxide supported by titanium oxide, and cerium oxide supported by silicon oxide.

The metal oxide may have a crystal size of about 10 nm to 100 nm as measured by X-ray diffraction. When the crystal size of the metal oxide is less than about 10 nm, the solubility may be too high and the reaction may not occur properly.

The sultone may include a compound represented by the following Formula 2:

[Formula 2]

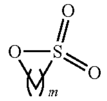

wherein m is an inter of 0 to 10.

The sultone may include 1,3-propane sultone represented by the following Formula 3 and 1,4-butane sultone represented by the following Formula 4:

[Formula 3]

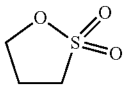

[Formula 4]

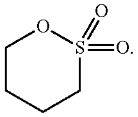

A proton conductive functional group represented by the following Formula 1 may be introduced to the metal oxide by reacting the starting material:

[Formula 1]

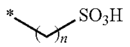

wherein * is a connection site to the metal oxide, and n is an integer of 1 to 10.

The proton conductive functional group may include the sulfonic acid group ($—SO_3H$); and a linker having one end bonded to the metal oxide and the other end bonded to the sulfonic acid group. The linker may include a substituted or unsubstituted alkyl group having 1 to 10 carbon atoms.

The conditions for the reaction are not particularly limited. For example, the starting material may be reacted at a temperature of about 80° C. to 150° C. for 1 hour to 48 hours.

Since a proton conductive functional group can be introduced to the surface of a metal oxide having antioxidative properties through stable sulfonation bonding, an antioxidant for a fuel cell having excellent antioxidative properties and proton conductivity may be obtained.

The electrolyte membrane 10 may include an ionomer and the antioxidant.

The ionomer may include a perfluorinated sulfonic acid polymer such as Nafion.

The electrolyte membrane 10 may include 0.1 parts by weight to 10 parts by weight of the antioxidant based on 100 parts by weight of the ionomer. When the content of the antioxidant is less than about 0.1 parts by weight, antioxidative properties may not be sufficient. When the content of the antioxidant is greater than about 10 parts by weight, its addition efficiency may not be good.

Each of the cathode 20 and the anode 30 may include a catalyst, an ionomer, and the antioxidant.

The catalyst may include a support and an active metal supported on the support.

The support is not particularly limited in its type, but may include, for example, at least one selected from the group consisting of carbon black, carbon nanotube, graphite, graphene, carbon fiber, carbon nanowire, and combinations thereof.

The active metal is not particularly limited in its type, but may include, for example, a noble metal such as platinum (Pt), palladium (Pd), iridium (Ir), or ruthenium (Ru). In addition, the active metal may further include a transition metal such as copper (Cu), cobalt (Co), nickel (Ni), or iron (Fe). The active metal may include a mixture of the noble metal and the transition metal or an alloy thereof.

The ionomer may include a perfluorinated sulfonic acid polymer such as Nafion.

EXAMPLE

Hereinafter, the present disclosure will be described in more detail through Examples. However, the following Examples are only examples to assist the understanding of the present disclosure, and the scope of the present disclosure is not limited thereto.

Preparation Example

A starting material was prepared by adding 6 g of cerium oxide and 1 g of 1,3-propane sultone to 50 ml of anhydrous toluene. The cerium oxide had a crystal size of about 25 nm as measured by X-ray diffraction.

After reacting the starting material at a temperature of about 100° C. for 12 hours, the resultant mixture was added to hexane to precipitate. A precipitate was obtained through centrifugation, and then dried in a reduced pressure oven for one day to obtain an antioxidant according to the present disclosure.

Figure 2:
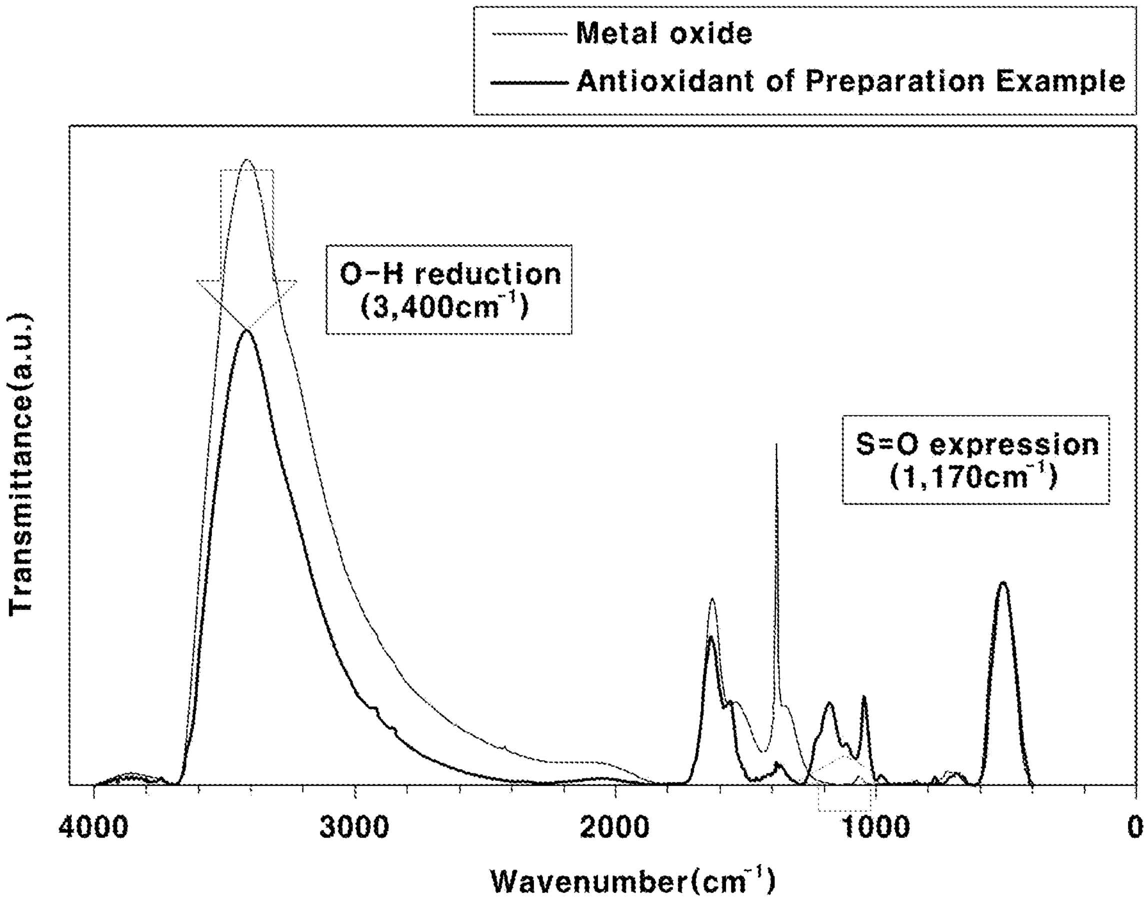
FIG. 2 shows an infrared spectral spectrum result for an exemplary antioxidant and a metal oxide according to a Preparation Example.

FIG. 2 is an infrared spectral spectrum result for an antioxidant and a metal oxide according to Preparation Example. As shown in FIG. 2, the antioxidant had a lower O—H peak and a higher S═O peak than the metal oxide. This means that a hydroxyl group of the metal oxide was substituted with a sulfonic acid group. In summary, the antioxidant may satisfy the following conditions 1 and 2:

$$I_{0,1}>I_{1,1} \quad \text{(Condition 1)}$$

$$I_{0,2}<I_{1,2} \quad \text{(Condition 2)}$$

In condition 1, $I_{0,1}$ is a height of a peak found in a wavenumber region of 3,400 $cm^{-1}$±100 $cm^{-1}$ in an infrared spectral spectrum for the metal oxide, and $I_{1,1}$ is a height of a peak found in a wavenumber region of 3,400 $cm^{-1}$±100 $cm^{-1}$ in an infrared spectral spectrum for the antioxidant.

In condition 2, $I_{0,2}$ is a height of a peak found in a wavenumber region of 1,170 $cm^{-1}$±100 $cm^{-1}$ in an infrared spectral spectrum for the metal oxide, and $I_{1,2}$ is a height of a peak found in a wavenumber region of 1,170 $cm^{-1}$±100 $cm^{-1}$ in an infrared spectral spectrum for the antioxidant.

Example

An electrolyte membrane containing an antioxidant according to the Preparation Example was manufactured. An electrolyte membrane was manufactured by coating and drying a solution containing a perfluorinated sulfonic acid polymer, which is an ionomer, and an antioxidant according to Preparation Example on a substrate.

Comparative Example 1

An electrolyte membrane containing only a perfluorinated sulfonic acid polymer, which is an ionomer, was prepared, without containing an antioxidant.

Comparative Example 2

An electrolyte membrane was manufactured in the same manner as in the Example except that cerium oxide, which is a metal oxide, was used as the antioxidant.

Comparative Example 3

An electrolyte membrane was prepared in the same manner as in the Example except that cerium ion was used as the antioxidant. An electrolyte membrane was manufactured by coating and drying a solution containing cerium hexahydrate, which is a precursor of the cerium ion, and a perfluorinated sulfonic acid polymer, which is an ionomer, on a substrate.

Figure 3:
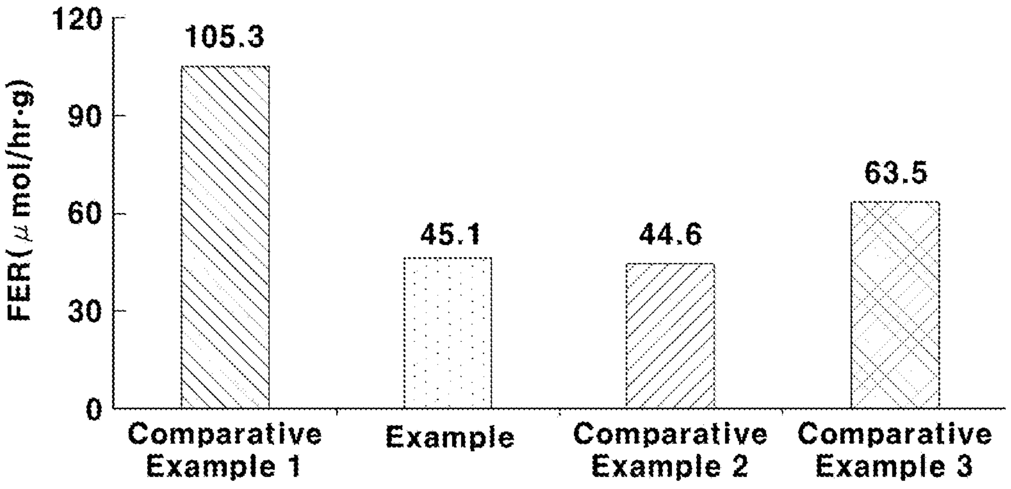
FIG. 3 shows antioxidative properties of electrolyte membranes according to an Example and Comparative Examples 1 to 3.

In order to evaluate the antioxidative properties of the electrolyte membranes according to the Example and Comparative Examples 1 to 3, each electrolyte membrane was reacted in a state of being immersed in a fenton solution for 24 hours to measure a fluorine emission rate (FER). When the antioxidative properties of the antioxidant are not sufficient, the electrolyte membrane is degraded by radicals generated by reacting the fenton solution with the electrolyte membrane, and fluorine ions ($F^-$) are released. Therefore, the antioxidative properties of the electrolyte membrane may be compared and evaluated by measuring the concentration of fluorine ions in the fenton solution after a certain period of time. As shown in FIG. 3, the electrolyte membrane according to the Example including the antioxidant according to exemplary embodiments of the present disclosure exhibited significantly less emission amount of fluorine ions compared to the electrolyte membranes according to Comparative Examples 1 to 3.

Figure 4:
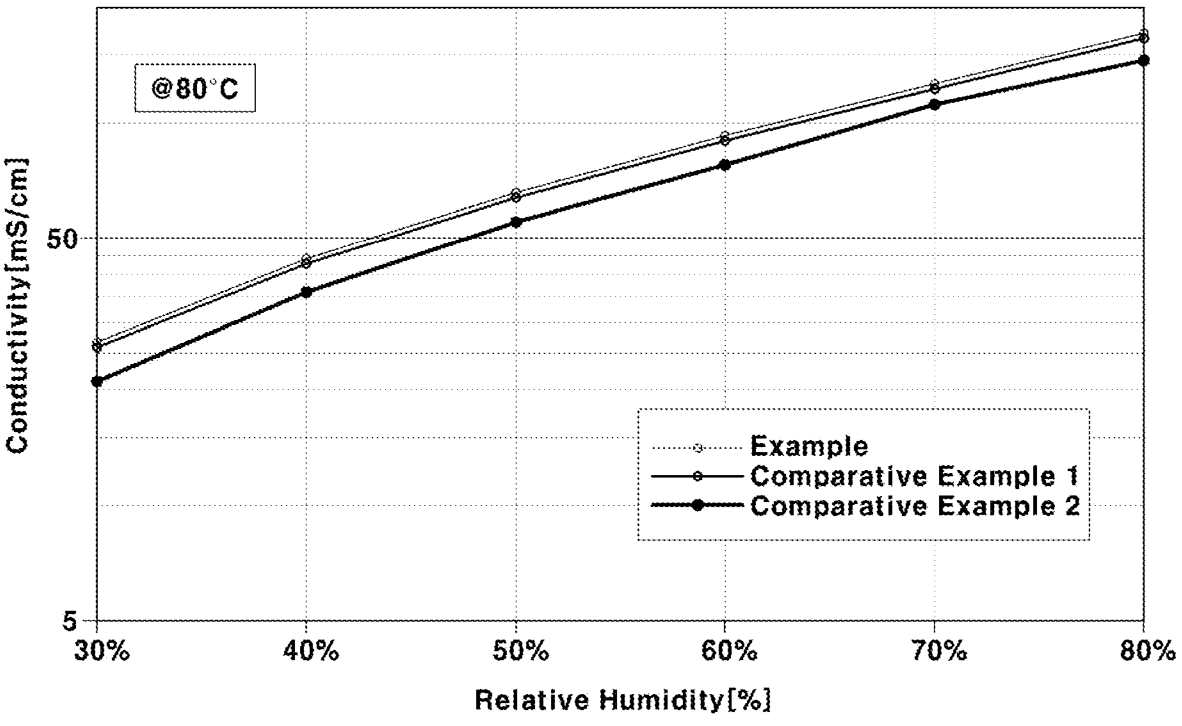
FIG. 4 shows proton conductivity according to the relative humidity of the electrolyte membranes according to an Example and Comparative Examples 1 to 3.

FIG. 4 is a graph obtained by measuring proton conductivity according to the relative humidity of the electrolyte membranes according to the Example and Comparative Examples 1 to 3. The measurement temperature was 80° C. As shown in FIG. 4, proton conductivity of the electrolyte membrane of according to the Example was equal to as that of the electrolyte membrane of Comparative Example 1 to which an antioxidant was not added, and was increased by about 25% or greater at a relative humidity of 50% compared to the electrolyte membrane to according to Comparative Example 1 including cerium oxide.

Although the Experimental Examples and Example of the present disclosure have been described in detail hereinabove, the scope of the present disclosure is not limited thereto, but may include several modifications and alterations made by those skilled in the art using a basic concept of the present disclosure as defined in the claims.

What is claimed is:

1. An antioxidant for a fuel cell, comprising:

a metal oxide; and a proton conductive functional group bonded to the metal oxide, wherein the proton conductive functional group comprises a sulfonic acid group attached to the metal oxide by a sulfonation bond, wherein the proton conductive functional group is represented by the following Formula 1:

[Formula 1]

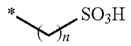

wherein * is a connection site to the metal oxide, and n is an integer of 1 to 10.

2. The antioxidant of claim 1, wherein the metal oxide comprises one or more selected from the group consisting of cerium oxide, cerium zirconium oxide, gadolinium doped cerium oxide, samarium doped cerium oxide, cerium oxide supported by titanium oxide, and cerium oxide supported by silicon oxide.

3. The antioxidant of claim 1, wherein the metal oxide has a crystal size of about 10 nm to 100 nm as measured by X-ray diffraction.

4. The antioxidant of claim 1, wherein the proton conductive functional group comprises:

the sulfonic acid group; and a linker connecting the metal oxide and the sulfonic acid group in the proton conductive functional group.

5. The antioxidant of claim 1, wherein the antioxidant satisfies the following conditions 1 and 2:

$$I_{0,1} > I_{1,1} \quad \text{(Condition 1)}$$

$$I_{0,2} < I_{1,2} \quad \text{(Condition 2)}$$

in condition 1, $I_{0,1}$ is a height of a peak found in a wavenumber region of 3,400 $cm^{-1}$±100 $cm^{-1}$ in an infrared spectral spectrum for the metal oxide, and $I_{1,1}$ is a height of a peak found in a wavenumber region of 3,400 $cm^{-1}$±100 $cm^{-1}$ in an infrared spectral spectrum for the antioxidant, and in condition 2, $I_{0,2}$ is a height of a peak found in a wavenumber region of 1,170 $cm^{-1}$±100 $cm^{-1}$ in an infrared spectral spectrum for the metal oxide, and $I_{1,2}$ is a height of a peak found in a wavenumber region of 1,170 $cm^{-1}$±100 $cm^{-1}$ in an infrared spectral spectrum for the antioxidant.

6. A fuel cell, comprising:

an electrolyte membrane comprising an ionomer;

a cathode disposed on one surface of the electrolyte membrane; and an anode disposed on the other surface of the electrolyte membrane, wherein at least one of the electrolyte membrane, the cathode, and the anode comprises the antioxidant according to claim 1.

7. The fuel cell of claim 6, wherein the electrolyte membrane comprises an amount of about 0.1 parts by weight to 10 parts by weight of the antioxidant based on 100 parts by weight of the ionomer.

8. A method of producing an antioxidant for a fuel cell, comprising:

preparing an admixture including metal oxide, sultone, and a solvent; and reacting the admixture, wherein a proton conductive functional group comprising a sulfonic acid group is attached to the metal oxide by a sulfonation bond.

9. The method of claim 8, wherein the solvent comprises toluene.

10. The method of claim 8, wherein the solvent does not comprises an aqueous solvent.

11. The method of claim 8, wherein the metal oxide comprises one or more selected from the group consisting of cerium oxide, cerium zirconium oxide, gadolinium doped cerium oxide, samarium doped cerium oxide, cerium oxide supported by titanium oxide, and cerium oxide supported by silicon oxide.

12. The method of claim 8, wherein the metal oxide has a crystal size of about 10 nm to 100 nm as measured by X-ray diffraction.

13. The method of claim 8, wherein the sultone comprises a compound represented by the following Formula 2:

[Formula 2]

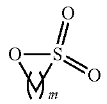

wherein m is an integer of 1 to 10.

14. The method of claim 8, wherein the proton conductive functional group is represented by the following Formula 1:

[Formula 1]

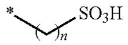

wherein * is a connection site to the metal oxide, and n is an integer of 1 to 10.

15. The method of claim 8, wherein the antioxidant satisfies the following conditions 1 and 2:

$$I_{0,1} > I_{1,1} \quad \text{(Condition 1)}$$

$$I_{0,2} < I_{1,2} \quad \text{(Condition 2)}$$

in condition 1, $I_{0,1}$ is a height of a peak found in a wavenumber region of 3,400 $cm^{-1}$±100 $cm^{-1}$ in an infrared spectral spectrum for the metal oxide, and $I_{1,1}$ is a height of a peak found in a wavenumber region of 3,400 $cm^{-1}$±100 $cm^{-1}$ in an infrared spectral spectrum for the antioxidant, and in condition 2, $I_{0,2}$ is a height of a peak found in a wavenumber region of 1,170 $cm^{-1}$±100 $cm^{-1}$ in an infrared spectral spectrum for the metal oxide, and $I_{1,2}$ is a height of a peak found in a wavenumber region of 1,170 $cm^{-1}$±100 $cm^{-1}$ in an infrared spectral spectrum for the antioxidant.

16. A vehicle comprising a fuel cell of claim 6.

* * * * *